United States Patent
Wittenbrink et al.

[11] Patent Number: 5,965,475
[45] Date of Patent: Oct. 12, 1999

[54] PROCESSES AN CATALYST FOR UPGRADING WAXY, PARAFFINIC FEEDS

[75] Inventors: Robert Jay Wittenbrink; Russell J. Koveal; William J. Murphy; Ian A. Cody; Albert E. Schweizer, all of Baton Rouge, La.

[73] Assignee: Exxon Research and Engineering Co., Florham Park, N.J.

[21] Appl. No.: 08/850,358

[22] Filed: May 2, 1997

[51] Int. Cl.$^6$ .............................. B01J 29/70; B01J 29/85
[52] U.S. Cl. ................. 502/66; 502/63; 502/64; 502/74; 502/208
[58] Field of Search ................ 502/63, 64, 66, 502/74, 208

[56] References Cited

U.S. PATENT DOCUMENTS

| | | | |
|---|---|---|---|
| 2,941,960 | 6/1960 | Hindin et al. | 502/63 |
| 3,684,690 | 8/1972 | Arey et al. | 502/74 |
| 5,254,518 | 10/1993 | Soled et al. | 502/241 |
| 5,723,716 | 3/1998 | Brandes et al. | 585/734 |

*Primary Examiner*—Thomas Dunn
*Attorney, Agent, or Firm*—Jay Simon

[57] ABSTRACT

An improved catalyst for the production of lube oil blending components, and lube oils, from waxy, paraffinic feeds, a process for producing such catalyst, and a process utilizing this catalyst in the production of lubes. The catalyst is a unitized mixed powder pellet catalyst constituted of a dehydrogenation component, or components, suitably a catalytically active Group VIB, VIIB, or VIII metal, or metals, an isomerization component, suitably an amorphous acidic solid support, and a small pore molecular sieve dewaxing component. The dewaxing component is characterized as a small pore molecular sieve wherein the pore windows are formed by 8 oxide atoms which form the limiting edge of the pore window, each of the oxide atoms constituting one of the four oxide atoms of a tetrahedrally coordinated cluster around a silicon or aluminum framework ion, or atom, each oxide ion is coordinated to two framework ions in these structures, and the pore size of the sieve ranges between about 6.3 Å and 2.3 Å. In preparation of the catalysts, the isomerization component, or the dewaxing component, or both, may provide the dehydrogenation function due to the presence of a catalytic metal, or metals, deposited thereon, in which case the components are powdered, the powders mixed together, compressed and formed into solids catalyst shapes comprised of these components. Alternatively, the dehydrogenation function can be added to preformed solids shapes made from powdered dewaxing and isomerization components.

12 Claims, No Drawings

PROCESSES AN CATALYST FOR UPGRADING WAXY, PARAFFINIC FEEDS

FIELD OF THE INVENTION

This invention relates to an improved catalyst for the production of lube oil blending components, and lube oils, from paraffin-containing, or waxy feeds, to a process for producing such catalyst, and to the process utilizing the catalyst in the production of lubes. In particular, it relates to a further improved unitized mixed powder pellet catalyst, and process utilizing this catalyst for the production of lube oil blending components, and lube oils, by conversion of paraffinic, or waxy feed materials.

BACKGROUND

It is known to isomerize or crack paraffinic, or waxy feeds to produce liquid products in the lubricating oil boiling range. Various catalysts have been used for this purpose, preferred catalysts generally being constituted of Group VIII noble metals composited with an acidic support. Catalytic dewaxing using small pore crystalline zeolites has also been used to remove paraffins, or waxy hydrocarbons from a feed; the waxy components being recovered from the feed via selective adsorption onto the zeolite rather than by chemical conversion. A method using a small pore zeolite catalyst to chemically convert, selectively dewax and recover a paraffinic, or waxy hydrocarbon from a feed however is known, and is disclosed in U.S. Pat. No. 3,684,691.

In accordance with the process disclosed in U.S. Pat. No. 3,684,691, a preheated n-paraffin-containing petroleum feed, and hydrogen, are passed downflow and contacted with a fixed bed of a crystalline alumino-silicate zeolite of average uniform pore size below about 6, particularly from 4 to less than 6 angstrom units, ion-exchanged with either hydrogen or a Group IIB metal, and reacted at conversion conditions to selectively convert the n-paraffins of the feed on entry into the pores to a lower boiling gaseous material which is evolved as an effluent. The more valuable branched and cyclic hydrocarbons, because they are incapable of entering the zeolite pores, are selectively passed downstream with the dewaxed liquid effluent.

In U.S. patent application Ser. No. 343,387, filed Nov. 22, 1994 by Brandes, Zinkie and Alward, now abandoned, of which the present Application is an improvement, there is disclosed a catalyst, and process utilizing this catalyst for the catalytic upgrading of paraffinic, or waxy feeds by selectively dewaxing these materials to produce lube oil products, or lubricants. The catalysts employed in this process are characterized as unitized mixed powder pellet catalysts constituted of both a dewaxing component and an isomerization component. The dewaxing component is a molecular sieve or zeolite of intermediate pore size; specifically, a zeolite having a 10 membered ring unidirectional pore material which has oval 1-D pores having a minor axis between 4.2 Å and 4.8 Å and a major axis between 5.4 Å and 7.0 Å as determined by X-ray crystallography. The dewaxing component is preferably impregnated with at least one Group VIII metal, most preferably a Group VIII noble metal such as platinum or palladium. In the preparation of the catalyst, the zeolite dewaxing component is powdered and mixed with the powdered isomerization catalyst component, characterized as a refractory metal oxide support, e.g., alumina, silica-alumina, zirconia, titanium, etc. on which has been deposited a catalytically active metal, e.g., a Group VIB, VIIB, or Group VIII metal, or mixture thereof, suitably platinum or palladium. This mixture of components is formed into a homogeneous mass, and the mass is compressed, extruded or pelletized to produce the unitized powder pellet catalyst. Whereas, this process and catalyst performs admirably, there nonetheless remains need for further improvements in both the process, and catalyst.

SUMMARY OF THE INVENTION

The present invention, which meets these and other needs, relates to a process for the isomerization and conversion of a paraffinic, or waxy feed, to lube oil blending components, and lube oils by contact of the feed, and hydrogen, at hydrocarbon conversion conditions with a further improved unitized powder pellet catalyst. It is formed from a dehydrogenatioin component, or components, and an isomerization component similar to those forming the unitized powder pellet catatlyst of the '387 Application, but differs therefrom in that it contains a dewaxing component characterized as a small pore 8 membered ring molecular sieve, e.g., a powdered zeolite; this catalyst providing even higher selectivity in the isomerization of n-paraffins than the unitized powder pellet catalyst of the '387 Application. Possibly, the 10 membered ring, intermediate pore size zeolite dewaxing component of the unitized mixed powder pellet catalyst of the '387 Application selectively admits into its pores and cracks both n-paraffins and hydrocarbons with some small to moderate degree of branching, while other more highly branched hydrocarbons of a waxy feed are selectively passed through the process to form part of the liquid product. The process utilizing this highly selective catalyst was thus found to produce from such feed a liquid product highly suitable for the production of lube oil blending components, and lube oils of high viscosity index and low pour point. The process of the present invention however, which utilizes the 8 membered ring, small pore molecular sieve as a component of the unitized mixed powder pellet catalyst, may admit into its pores and crack the n-paraffins and a far lesser amount, perhaps substantially nil, of the hydrocarbon feed components which are lightly or moderately branched. Or, perhaps the branched paraffins do not, and cannot enter into the pores but are held at the pore entrances and cracked by contact with the isomerization component of the catalyst. The mechanism of the reaction is unknown. Surprisingly however, whatever the mechanism, the catalyst of this invention is even more highly selective in cracking the non-branched paraffins and passing the branched paraffins than the catalyst of the '387 Application. The lightly or moderately branched hydrocarbons, plus the more highly branched hydrocarbons of the feed are thus separated from the non-branched hydrocarbons and passed through the process as liquids to form higher yields of lube oil blending components, and lube oils superior to those formed in the process embodied by the '387 Application. Moreover, overall gas make and naphtha production are lessened as contrasted with the process embodied by the '387 Application.

The catalyst of this invention is characterized as particulate solids particles made by mixing together a powdered molecular sieve dewaxing component and a powdered amorphous isomerization component, one or both components of which, preferably both, contains a dehydrogenation component, or components, (or to which is subsequently added a dehydrogenation component, or components), forming a homogeneous mass from the mixture, and pelletizing the mass to produce solids particles, or pellets, each of which contains the dewaxing component, the isomerization component, and the dehydrogenation component, or components, in intimate admixture; or contains the dewaxing component and the isomerization component to which is added the dehydroisomerization component, or components, to form particulate solids wherein the dewaxing component, the isomerizing component and hydrogenation component are present in intimate mixture. The components of the catalyst work together, cooperatively and synergistically, to selectively crack and convert the n-paraffins, or waxy components of the feed, to produce reaction products which are removed from the process as gas, while allowing branched hydrocarbons to pass downstream for removal as useful lube oil blending components, and lube oil products. This process, and catalyst, permits the conversion of e.g., Fischer-Tropsch reaction products, slack waxes and waxy raffinates to upgraded products from which lubricants of high viscosity index and low pour point can be recovered. The process accomplishes this objective, and others, while minimizing the production of the less desirable gas and naphtha.

In preparation of the unitized powder pellet catalyst, the catalytic metal, or metals, dehydrogenation component can be composited with the dewaxing component, or the catalyst metal, or metals, dehydrogenation component can be composited with the isomerization component, or the catalytic metal, or metals, dehydrogenation component can be composited with both the dewaxing and the isomerization components prior to formation of the unitized powder pellet catalyst. The unitized powder pellet catalyst can be formed from the dewaxing and isomerization components and a catalytic metal, or metals, dehydrogenation component can then be composited with the particulate solids formed from the dewaxing and isomerization components. Suitably, the dehydrogenation component is a Group VIB, Group VIIB, or Group VIII metal, or metals, preferably a Group VIII noble metal, or metals, of the Periodic Table of the Elements (Sargent-Welch Scientific Company: Copyright 1968), suitably ruthenium, rhodium, palladium, osmium, iridium and platinum. Suitably, the catalytic metal, or metals, dehydrogenation component is present in concentration ranging from about 0.1 percent to about 5.0 percent, preferably from about 0.1 percent to about 3.0 percent, based on the weight of the total catalyst (dry basis). In general, the molecular sieve component is present in the catalyst in concentrations ranging from about 2 percent to about 80 percent, preferably from about 20 percent to about 60 percent, based on the weight of the catalyst (dry basis). The isomerization component is generally present in concentration ranging from about 20 percent to about 75 percent, preferably from about 30 percent to about 65 percent, based on the weight of the catalyst (dry basis).

The catalysts, besides the dewaxing, isomerization, and dehydrogenation components, may optionally also contain binder materials. Exemplary of such binder materials are silica, alumina, silica-alumina, clays, magnesia, titania, zirconia or mixtures of these with each other or with other materials. Silica and alumina are preferred, with alumina being the most preferred binder. The binder, when present, is generally present in amount ranging from about 5 percent to about 50 percent, preferably from about 20 percent to about 30 percent, based on the weight of the total catalyst (dry basis; wt. %).

The molecular sieve comprising the dewaxing component of the unitized mixed powder pellet catalyst of this invention is a small pore molecular sieve. It is one wherein the pore windows are formed by 8 oxide atoms that form the limiting edge of this pore window. The oxide atoms each constitute one of the four oxide atoms of a tetrahedrally coordinated cluster around a silicon or aluminum ion, called a framework ion or atom. Each oxide ion is coordinated to two framework ions in these structures. The structure is referred to as "8 ring" as a shorthand way of describing a more complex structure; a shorthand notation used extensively in describing molecular sieves of this type is the Atlas Of Zeolite Structure Types, Fourth Revised Edition 1996 in 8 Zeolites 17:1–230, 1996. Pores of this size are such as to substantially exclude molecules of larger size than normal hexane, or, conversely, to allow entry into the pores of molecules of smaller size than normal hexane. The small pore molecular sieve is of pore size ranging between about 6.3 Å and 2.3 Å, preferably about 5.1 Å to about 3.4 Å, and comprised of a crystalline tetrahedral framework oxide component. It is preferably selected from the group consisting of zeolites, tectosilicates, tetrahedral aluminophosphates and tetrahedral silicoaluminophosphates (SAPOs). Exemplary of the molecular sieve components of this type are SAPO-56 (AFX), ZK-5 (KF1), AlPO$_4$-25 (ATV), Chabazite (CHA), TMA-E (EAB), Erionite (ERI), and Linde Type A (LTA). The Linde Type A zeolite is a particularly preferred molecular sieve.

The unitized catalyst can be prepared from the finished catalysts, i.e., by pulverizing and powdering each of the finished catalysts, and then mixing together the powdered finished molecular sieve catalyst and the powdered finished isomerization catalyst, as components, and then compressing the homogeneous mass to form particulate solid shapes, e.g., lumpy solid shapes, extrudates, beads, pellets, pills, tablets or the like. One or more catalysts of given type can be pulverized and powdered, and mixed to provide a necessary component, or components, of the unitized mixed pellet catalyst. For example, a molecular sieve catalyst can supply the dewaxing and dehydrogenating functions, to wit: a molecular sieve component composited with, preferably by impregnation, a Group VIII metal, or metals, of the Periodic Table, most preferably a Group VIII noble metal, or metals, e.g., platinum or palladium. Generally, the catalyst is impregnated with from about 0.1 percent to about 5.0 percent, preferably from about 0.1 percent to about 3.0 percent, based on the weight of the catalytic component (wt. %; dry basis).

The isomerization component of the catalyst is comprised of an amorphous acidic material; and an isomerization catalyst comprised of an acidic support composited with a catalytically active metal, preferably a Group VIII noble metal of the Periodic Table, suitably ruthenium, rhodium, palladium, osmium, iridium and platinum can supply the isomerization and dehydrogenation functions. The isomerization catalyst component can thus be an isomerization catalyst such as those comprising refractory metal oxide support base (e.g., alumina, silica-alumina, zirconia, titanium, etc.) on which is deposited a catalytically active metal selected from the group consisting of Group VIB, Group VIIB, Group VIII metals and mixtures thereof, preferably Group VIII metals, more preferably noble Group VIII metals, most preferably platinum or palladium and optionally including a promoter or dopant such as halogen, phosphorus, boron, yttria, magnesia, etc. preferably halogen, yttria or magnesia, most preferably fluorine. The catalytically active metals are present in the range of from about 0.1 to about 5.0 wt. %, preferably from about 0.1 to about 3.0 wt. %. The promoters and dopants are used to control the acidity of the isomerization catalyst. Thus, when the isomerization catalyst employs a base material such as alumina, acidity is imparted to the resultant catalyst by addition of a halogen, preferably fluorine. When a halogen is used, preferably fluorine, it is present in an amount in the range of about 0.1 to about 10 wt. %, preferably about 0.1 to about 3 wt. %, more preferably from about 0.1 to about 2 wt. % most preferably from about 0.5 to about 1.5 wt. %. Similarly, if silica-alumina is used as the base material, acidity can be controlled by adjusting the ratio of silica to alumina or by adding a dopant such as yttria or magnesia which reduces the acidity of the silica-alumina base material as taught in U.S. Pat. No. 5,254,518 (Soled, McVicker, Gates, Miseo).

Feeds containing waxy, paraffinic hydrocarbons suitable for conversion, isomerization and upgrading to produce lube oil blending components, and lube oils pursuant to the practice of this invention are available from a variety of sources; both petroleum and non-petroleum sources. For example, a slack wax, or wax recovered from a petroleum hydrocarbon by solvent or propane dewaxing constitutes a suitable feed, though such feeds can contain from about 25 percent to about 50 percent entrained oil. Other waxy feeds from various petroleum sources such as waxy raffinates and waxy distillates can, on the other hand, contain up to about 95 percent wax; and, if desired, can be mildly solvent dewaxed to concentrate and recover the waxy portion of the feed for conversion, and upgrading. Waxy feeds from petroleum sources often contain sulfur and nitrogen compounds as impurities which are known to suppress catalyst activity, and even deactivate catalysts, and hence it is often necessary to hydrotreat these feeds to reduce the sulfur concentration below about 10 ppm, preferably below 2 ppm sulfur, and reduce the nitrogen concentration below 2 ppm, preferably below 1 ppm nitrogen. The process of hydro-treating to reduce sulfur and nitrogen levels, as known, can be conducted using any typical hydrotreating catalyst such as Ni/Mo on alumina, Co/Mo on alumina, Co/Ni/Mo on alumina, e.g., KF-840, KF-843, HDN-30, HDN-60, Criteria C-411, etc. Similarly, bulk catalysts comprising Ni/Mn/Mo or Cr/Ni/Mo sulfides as described in U.S. Pat. No. 5,122,258 can be used. Hydrotreating is carried out at temperatures ranging from about 280° C. to about 400° C., preferably from about 340° C. to about 380° C. at pressures in the range of about 500 to about 3000 psi, hydrogen treat gas rate in the range of about 500 to about 5000 SCF/bbl and at a flow velocity in the range of about 0.1 to about 5 LHSV, preferably from about 1 to about 2 LHSV.

The preferred feed is a Fischer-Tropsch wax, or mixture of waxy paraffinic hydrocarbons, particularly those of carbon number greater than 16, e.g., $C_{16}+$. Waxy paraffinic products from the Fischer-Tropsch reaction do not contain sulfur, nitrogen or aromatic hydrocarbons. These non-sulfur, non-nitrogen, non-aromatics containing hydrocarbons are produced via a synthesis process wherein mixtures of hydrogen and carbon monoxide (synthesis gas) are reacted over a suitable catalyst and converted to $C_5+$ liquid hydrocarbons. The $C_5+$ hydrocarbons can be produced and shipped from a remote area to a refinery site for further reacting and upgrading to a variety of products, or both produced and upgraded at a refinery site. The synthesis reaction is carried out at temperatures of about 160° C. to about 325° C., preferably from about 190° C. to about 260° C., pressures of about 5 atm to about 100 atm, preferably from about 10–40 atm and gas hourly space velocities of from about 300 V/Hr/V to about 20,000 V/Hr/V, preferably from about 500 V/Hr/V to about 15,000 V/Hr/V. The stoichiometric ratio of hydrogen to carbon monoxide in the synthesis gas is about 2.1:1 for the production of higher hydrocarbons. However, $H_2$/CO ratios of about 1:1 to about 4:1, preferably from about 1.5:1 to about 2.5:1, more preferably from about 1.8:1 to about 2.2:1 can be employed. These reaction conditions are well known and a particular set of reaction conditions can be readily determined by those skilled in the art. The reaction may be carried out in virtually any type reactor, e.g., fixed bed, moving bed, fluidized bed, slurry, bubbling bed, etc. Separator products from the F-T reactor, i.e., hot separator and cold separator liquids, respectively, $C_4$–$C_{15}$ hydrocarbons, from the F-T reactor constituting high quality paraffin solvents can, if desired, be hydrotreated to remove olefin impurities, or employed without hydrotreating to produce a wide variety of wax products. The reactor wax, or $C_{16}+$ liquid hydrocarbons from the F-T reactor, and some of the hot separator liquids can be, on the other hand, upgraded by various hydroconversion reactions, e.g., hydrocracking, hydroisomerization catalytic dewaxing, isodewaxing, etc. or combinations thereof, to produce such products as stable, environmentally benign, non-toxic mid-distillates, diesel and jet fuels, e.g., low freeze point jet fuel, high cetane jet fuel, isoparaffinic solvents, non-toxic drilling oils suitable for use on drilling muds, lubricants, e.g., lube oil blending components and lube oil base stocks suitable for transportation vehicles, technical and medicinal grade white oil, various chemical raw materials, and specialty products.

The catalyst of the present invention, and process utilizing this catalyst serves its greatest utility in its use in hydroisomerizing a waxy, paraffinic feed, particularly the F-T reactor wax and related waxes, to lubricants, especially high viscosity index, low pour point oil blending components and lube oil base stocks suitable for use in transportation vehicles.

The hydroisomerization process, or process of this invention, is conducted generally at temperature ranging from about 300° C. to about 375° C., preferably from about 330° C. to about 360° C., pressures ranging from about 500 psig to about 3000 psig, preferably from about 1000 psig to about 1500 psig, hydrogen treat gas rates ranging from about 1000 SCF/Bbl to about 10,000 SCF/Bbl, preferably from about 1000 SCF/bbl to about 3000 SCF/bbl, and flow velocities ranging from about 0.1 LHSV to about 10 LHSV, preferably from about 0.5 LHSV to about 2 LHSV.

The following non-limiting example, and comparative demonstrations, exemplify the more salient and preferred embodiments of the invention.

EXAMPLE AND DEMONSTRATIONS

Catalyst Preparations

Catalyst A (Unitized Mixed Powder Pellet Catalyst)

A first catalyst, a catalyst of this invention, was prepared using an amorphous silica-alumina which contained 13% by weight aluminum and an 8-ring, small pore Linde Type A (LTA) zeolite, as designated in the Atlas of Zeolites, supra, but more commonly referred to as zeolite 5A. Each of the two materials were ground to very small particles and an alumina binder was added in the amount of 20% by weight. The mixture was thoroughly mixed by mulling and then extrudates were prepared. Palladium (0.30 wt. %) was then deposited on the extrudates using standard incipient wetness techniques. The catalyst was crushed and sized to 14/35 mesh (Tyler).

Catalyst B (Ed/Amorphous Silica-Alumina Catalyst)

A second catalyst was prepared using an amorphous silica-alumina which contained 13% by weight alumina. An alumina binder was added in the amount of 30% by weight. From this mixture extrudates were prepared, with a surface area of 394 $m^2$/g and a pore volume of 0.57 mL/g as determined by water adsorption. Palladium (0.30 wt. %) was then deposited on the extrudates using standard incipient wetness techniques. The catalyst was crushed and sized to 14/35 mesh (Tyler).

Catalyst C (Dewaxing Catalyst)

A third catalyst was prepared which contained only zeolite 5A, an alumina binder, and a metal component. Platinum (0.50 wt. %) was deposited on the 5A powder using standard incipient wetness techniques.

The material was then pressed into pellets, crushed and sized to 14/35 mesh (Tyler).

Hydroconversion Runs With Catalysts A, B and C

Hydroconversion runs were conducted with each of Catalyst A, B and C, respectively. Each catalyst was evaluated at 750 psig hydrogen pressure with a nominal treat gas rate of 2500 SCF/B at 0.5 LHSV. The degree of 700° F.+ conversion was varied by adjusting the reactor temperature. The feed was a 700° F.+ Fischer-Tropsch hydroisomerate sample. Feed properties are listed in Table 1, while the properties of the 700–950° F. fraction of the feed are listed in Table 2.

TABLE 1

FEEDSTOCK PROPERTIES

| ° API Gravity | |
|---|---|
| Boiling Point Distribution by GCD, wt. % Off | 40.3° F. |
| IBP/5 | 667/713 |
| 10/20 | 728/755 |
| 30/40 | 781/809 |
| 50/60 | 842/880 |
| 70/80 | 926/984 |
| 90/FBP | 1070/1281 |

TABLE 2

PROPERTIES OF 700–950° F. FEED FRACTION

| Pour Point, ° C. | 15 |
|---|---|
| Kinematic Viscosity at 40° C., cSt | 15.74 |
| Kinematic Viscosity at 100° C., cSt | 3.821 |
| Viscosity Index | 139 |

The results of the run made with Catalyst A are given in Table 3.

TABLE 3

RESULTS FROM UNITIZED MIXED POWDER PELLET (CATALYST A)

| Reactor Temperature, ° F. | 590 | 580 | 570 | 560 |
|---|---|---|---|---|
| 700° F. + Conversion, wt. % | 49.42 | 35.40 | 26.37 | 17.43 |
| Yields, wt. % | | | | |
| $C_1$–$C_4$ | 1.74 | 0.96 | 1.02 | 0.97 |
| $C_5$–320° F. | 10.08 | 7.27 | 6.90 | 5.97 |
| 320–500° F. | 21.03 | 13.05 | 9.15 | 4.14 |
| 500–700° F. | 17.76 | 15.64 | 11.01 | 8.28 |
| 700° F.+ | 49.40 | 63.09 | 71.91 | 80.64 |
| PROPERTIES OF 700–950° F. LUBE FRACTION | | | | |
| Pour Point, ° C. | −25 | 3 | 7 | 10 |
| Kinematic Viscosity at 40° C., cSt | 13.83 | 14.97 | 15.80 | 15.49 |
| Kinematic Viscosity at 100° C., cSt | 3.42 | 3.59 | 3.76 | 3.72 |
| Viscosity Index | 124 | 124 | 130 | 130 |

The results of the run made with Catalyst B are given in Table 4.

TABLE 4

RESULTS FROM Pd/AMORPHOUS SILICA-ALUMINA CATALYST (CATALYST B)

| Reactor Temperature, ° F. | 600 | 590 | 580 | 570 |
|---|---|---|---|---|
| 700° F. + Conversion, wt. % | 83.08 | 65.89 | 50.31 | 35.63 |
| Yields, wt. % | | | | |
| $C_1$–$C_4$ | 3.60 | 2.54 | 1.74 | 1.24 |
| $C_5$–320° F. | 25.74 | 16.83 | 10.79 | 6.24 |
| 320–500° F. | 28.81 | 20.97 | 15.16 | 10.21 |
| 500–700° F. | 25.32 | 26.35 | 23.79 | 19.45 |
| 700° F.+ | 16.52 | 33.31 | 48.52 | 62.87 |
| PROPERTIES OF 700–950° F. LUBE FRACTION | | | | |
| Pour Point, ° C. | −4 | −1 | 13 | 19 |
| Kinematic Viscosity at 40° C., cSt | 15.45 | 15.89 | 15.01 | 15.10 |
| Kinematic Viscosity at 100° C., cSt | 3.68 | 3.75 | 3.65 | 3.72 |
| Viscosity Index | 126 | 127 | 131 | 139 |

No conversion of the feed was achieved with Catalyst C up to 750° F., this indicating the inactivity of this catalyst.

These results show clearly a quality improvement benefit at constant yield for the unitized mixed powder pellet catalyst. For instance, at approximately 50% 700° F.+ conversion, the unitized catalyst (Catalyst A) produced a lube fraction with a pour point of −25° C. and a viscosity index of 124. At a similar level of conversion, the isomerization catalyst alone (Catalyst B), produced a lube fraction with a pour point of 13° C. The dewaxing catalyst alone (Catalyst C) was completely inactive. Similarly, these data show a yield improvement at constant quality benefit for the unitized mixed powder pellet catalyst. In looking at constant nominal pour point, for example, taking the 10° C. pour point example from Catalyst A and the 13° C. pour point example from Catalyst B, one finds an approximately 80% lube yield for Catalyst A and approximately 49% lube yield for Catalyst B; both at about the same V.I.

Moreover, the unitized powder pellet catalyst produces extremely low gas and naphtha yields. It is well known that for the more typical dewaxing catalyst (e.g., ZSM-5 or mordenite) essentially all of the waxy material is converted to undesirable gas and naphtha. However, the unitized catalyst produces a more balanced product slate with more valuable distillates being produced as opposed to all gas and naphtha production.

In addition, data was obtained from Catalysts D and E, each prepared using medium pore sized (i.e., 10-ring) zeolites as the dewaxing component of the unitized mixed powder pellet catalyst, combined with the same amorphous silica-alumina component as in the previous preparations.

Catalyst Preparations

Catalyst D (Unitized Mixed Powder Pellet; Not of this Invention)

In the present example a catalyst was prepared using an amorphous silica-alumina which contains 13% by weight alumina as the isomerization component and zeolite Theta-1 (TON) as the dewaxing component. The two materials were ground to very small particles and an alumina binder was added in the amount of 20% by weight. The mixture was thoroughly mixed by mulling and extrudates were prepared. Palladium (0.30 wt. %) was then deposited on the extrudates using standard incipient wetness techniques. Prior to evaluation the catalyst was crushed and sized to 14/35 mesh (Tyler).

Catalyst E (Unitized Mixed Powder Pellet Catalyst; Not of this Invention)

Catalyst E was prepared using an amorphous silica-alumina which contains 13% by weight alumina as the isomerization component and zeolite silicalite as the dewaxing component. Silicalite has an isotypic framework structure equivalent to ZSM-5 (MFI) and is a medium pore 10-ring zeolite. Silicalite, however, has a much higher $SiO_2:Al_2O_3$ ratio than typical ZSM-5 structures and is therefore much less acidic. The two materials were ground to very small particles and an alumina binder was added in the amount of 20% by weight. The mixture was thoroughly mixed by mulling and the extrudates were prepared. Palladium (0.30 wt. %) was then deposited on the extrudates using standard incipient wetness techniques. Prior to evaluation the catalyst was crushed and sized to 14/35 mesh (Tyler).

Hydroconversion runs were conducted with both Catalysts D and E with the same feed, at conditions identical to those described in Tables 1 and 2, respectively.

The results of the runs made with Catalysts D and E, respectively, are given in Tables 5 and 6, respectively.

TABLE 5

RESULTS FROM UNITIZED MIXED POWDER PELLET CATALYST
USING ZEOLITE THETA-1 (TON)
(CATALYST D)

| Reactor Temperature, ° F. | 590 | 580 | 570 | 560 |
|---|---|---|---|---|
| 700° F. + Conversion, wt. % | 70.19 | 57.92 | 46.38 | 44.19 |
| Yields, wt. % | | | | |
| $C_1$–$C_4$ | 3.54 | 2.39 | 2.37 | 1.98 |
| $C_5$–320° F. | 20.94 | 15.82 | 13.02 | 12.18 |
| 320–500° F. | 21.80 | 17.31 | 12.16 | 12.61 |
| 500–700° F. | 24.60 | 23.38 | 20.08 | 18.72 |
| 700° F.+ | 29.12 | 41.10 | 52.37 | 54.51 |
| PROPERTIES OF 700–950° F. LUBE FRACTION | | | | |
| Pour Point, ° C. | −48 | −44 | −37 | −24 |
| Kinematic Viscosity at 40° C., cSt | 14.87 | 14.41 | 14.95 | 15.64 |
| Kinematic Viscosity at 100° C., cSt. | 3.52 | 3.44 | 3.57 | 3.71 |
| Viscosity Index | 117 | 115 | 123 | 126 |

TABLE 6

RESULTS FROM UNITIZED MIXED POWDER PELLET CATALYST
USING SILICALITE
(CATALYST E)

| Reactor Temperature, ° F. | 590 | 580 | 570 | 560 |
|---|---|---|---|---|
| 700° F. + Conversion, wt. % | 57.80 | 48.96 | 43.27 | 47.11 |
| Yields, wt. % | | | | |
| $C_1$–$C_4$ | 3.45 | 3.45 | 3.05 | 2.68 |
| $C_5$–320° F. | 17.50 | 14.06 | 14.97 | 15.71 |
| 320–500° F. | 15.89 | 13.23 | 10.02 | 12.96 |
| 500–700° F. | 21.95 | 19.41 | 16.55 | 16.99 |
| 700° F.+ | 41.21 | 49.84 | 55.40 | 51.65 |
| PROPERTIES OF 700–950° F. LUBE FRACTION | | | | |
| Pour Point, ° C. | −22 | −15 | −10 | −1 |
| Kinematic Viscosity at 40° C., cSt | 14.87 | 15.34 | 15.28 | 15.47 |
| Kinematic Viscosity at 100° C., cSt. | 3.56 | 3.62 | 3.64 | 3.70 |
| Viscosity Index | 122 | 121 | 124 | 128 |

These data show that the unitized mixed powder catalyst prepared with the amorphous silica-alumina isomerization component and zeolite Theta-1 (TON) is very effective at reducing the pour point of the lubes. The catalyst prepared with the silicalite, however, is not nearly as effective. The advantage of the small pore 8-ring zeolites over the medium sized 10-ring zeolites, particularly TON, is in the selectivity of the catalysts. This is clearly exemplified in Table 7 which shows the product distribution for the three catalysts at approximately the same 700° F.+ conversion or lube yield. It is further exemplified in Table 8 which shows the product distribution for the three catalysts at approximately the same pour point of about −24 which is typical of lubricant base stocks in this viscosity range. In both cases the unitized mixed powder catalyst prepared with the small pore 8-ring zeolite (i.e., Linde Type A) produced significantly less undesirable gas and naphtha.

TABLE 7

COMPARISON OF UNITIZED MIXED POWDER CATALYST AT
CONSTANT CONVERSION OR LUBE YIELD

| Dewaxing Component | Linde Type A (LTA) (Catalyst A) | Theta-1 (TON) (Catalyst D) | Silicalite (MF1) (Catalyst E) |
|---|---|---|---|
| 700° F. + Conversion, wt. % | 49.42 | 46.38 | 48.96 |
| Yields, wt. % | | | |
| $C_1$–$C_4$ | 1.74 | 2.37 | 3.45 |
| $C_5$–320° F. | 10.08 | 13.02 | 14.06 |
| 320–500° F. | 21.03 | 12.16 | 13.23 |
| 500–700° F. | 17.76 | 20.08 | 19.41 |
| 700° F. + (Lube Yield) | 49.40 | 52.37 | 49.84 |

TABLE 8

COMPARISON OF UNITIZED MIXED POWDER CATALYSTS AT
CONSTANT POUR POINT

| Dewaxing Component | Linde Type A (LTA) (Catalyst A) | Theta-1 (TON) (Catalyst D) | Silicalite (MF1) (Catalyst E) |
|---|---|---|---|
| Pour Point | −25 | −24 | −22 |
| Yields, wt. % | | | |
| $C_1$–$C_4$ | 1.74 | 1.98 | 3.45 |
| $C_5$–320° F. | 10.08 | 12.18 | 17.50 |
| 320–500° F. | 21.03 | 12.61 | 15.89 |
| 500–700° F. | 17.76 | 18.72 | 21.95 |
| 700° F. + (Lube Yield) | 49.40 | 54.51 | 41.21 |

It is apparent that various modifications and changes can be made without departing the spirit and scope of the invention.

Having described the invention, what is claimed is:

1. In a process for the preparation of a unitized mixed powder pellet catalyst comprised of a powdered molecular sieve dewaxing component, a powdered amorphous acidic isomerization component, and dehydrogenation component compressed to form said catalyst which is useful for the conversion of a waxy, paraffinic hydrocarbon feed produced via Fischer-Tropsch synthesis to form therefrom lube oil blending components, and lube oils, the improvement wherein the powdered molecular sieve dewaxing component of said catalyst comprises a small pore molecular sieve wherein the pore windows are formed by 8 oxide atoms which form the limiting edge of the pore window, each of the oxide atoms constituting one of the four oxide atoms of a tetrahedrally coordinated cluster around a silicon or aluminum framework ion, or atom, each oxide ion is coordinated to two framework ions in these structures, the pore size of the sieve ranges between about 6.3 Å and 2.3 Å, and the catalyst is one containing from about 2 percent to about 80 percent of the molecular sieve dewaxing component, and from about 20 percent to about 75 percent of the isomerization component, based on the total weight of the catalyst, wherein, at constant yield, on conversion of said waxy, paraffinic hydrocarbon feed to a lube oil blending component, or lube oil, by contact at reaction conditions with said unitized mixed powder pellet catalyst a lube oil blending component, or lube oil of lower pour point is obtained as contrasted with the conversion of a similar waxy, paraffinic hydrocarbon feed at similar reaction conditions to obtain a lube oil blending component, or lube oil by contact with a catalyst similar to said unitized mixed powder pellet catalyst except that it is (i) a catalyst comprised of a powdered molecular sieve dewaxing component and a dehydrogenation component, but no amorphous acidic isomerization component, or (ii) a catalyst comprised of a powdered amorphous acidic isomerization component and a dehydrogenation component, but no molecular sieve dewaxing component.

2. The process of claim 1 wherein the pore size of the molecular sieve dewaxing component ranges between about 5.1 Å and 3.4 Å.

3. The process of claim 1 wherein the molecular sieve dewaxing component is selected from the group consisting of zeolites, tectosilicates, tetrahedral aluminophosphates and tetrahedral silicaluminophosphates (SAPOs).

4. The process of claim 1 wherein the catalyst additionally contains a binder.

5. The process of claim 1 wherein the catalyst is comprised of from about 2 percent to about 80 percent of the molecular sieve dewaxing component, from about 20 percent to about 75 percent of the isomerization component, and from about 5 percent to about 50 percent of a binder, based on the total weight of the catalyst.

6. The process of claim 1 wherein the dehydrogenation component is comprised of a Group VIB, Group VIIB, or Group VIII metal, or metals.

7. The process of claim 1 wherein the unitized mixed powder pellet catalyst is formed by crushing and powdering a molecular sieve dewaxing catalyst, and an isomerization catalyst, at least one of the catalysts of which contains a dehydrogenation component; the powdered catalysts being compressed together to form said unitized mixed powder pellet catalyst.

8. In a unitized mixed powder pellet catalyst composition comprised of a powdered molecular sieve dewaxing component, a powdered amorphous acidic isomerization component, and a dehydrogenation component useful for the conversion of a waxy, paraffinic hydrocarbon feed produced via Fischer-Tropsch synthesis to form therefrom lube oil blending components, and lube oils the improvement wherein the powdered molecular sieve dewaxing component of the catalyst is comprised of a small pore molecular sieve wherein the pore windows are formed by 8 oxide atoms which form the limiting edge of the pore window, each of the oxide atoms constituting one of the four oxide atoms of a tetrahedrally coordinated cluster around a silicon or aluminum framework ion, or atom, each oxide ion is coordinated to two framework ions in these structures, the pore size of the sieve ranges between about 6.3 Å and 2.3 Å, and the catalyst is one containing from about 2 percent to about 80 percent of the molecular sieve dewaxing component, and from about 20 percent to about 75 percent of the isomerization component, based on the total weight of the catalyst, wherein, at constant yield, on conversion of said waxy, paraffinic hydrocarbon feed to a lube oil blending component, or lube oil, by contact at reaction conditions with said unitized mixed powder pellet catalyst a lube oil blending component, or lube oil of lower pour point is obtained as contrasted with the conversion of a similar waxy, paraffinic hydrocarbon feed at similar reaction conditions to obtain a lube oil blending component, or lube oil by contact with a catalyst similar to said unitized mixed powder pellet catalyst except that it is (i) a catalyst comprised of a powdered molecular sieve dewaxing component and a dehydrogenation component, but no amorphous acidic isomerization component, or (ii) a catalyst comprised of a powdered amorphous acidic isomerization component and a dehydrogenation component, but no molecular sieve dewaxing component.

9. The catalyst composition of claim 8 wherein the pore size of the molecular sieve dewaxing component ranges between about 5.1 Å and 3.4 Å.

10. The catalyst composition of claim 8 wherein the molecular sieve dewaxing component is selected from the group consisting of zeolites, tectosilicates, tetrahedral aluminophosphates and tetrahedral silicaluminophosphates (SAPOs).

11. The catalyst composition of claim 8 wherein the catalyst additionally contains a binder.

12. The catalyst composition of claim 8 wherein the catalyst is comprised of from about 2 percent to about 80 percent of the molecular sieve components, from about 20 percent to about 75 percent of the isomerization components, and from about 5 percent to about 50 percent of a binder, based on the total weight of the catalyst.

* * * * *